Dec. 16, 1924.　　　　　　　　　　　　　　　　　　　1,519,109
G. R. BROWN
BALING PRESS
Filed May 4, 1917　　　　　　7 Sheets-Sheet 1

G. R. BROWN

BALING PRESS

Filed May 4, 1917   7 Sheets-Sheet 2

Dec. 16, 1924.                                                                      1,519,109
G. R. BROWN
BALING PRESS
Filed May 4, 1917                                7 Sheets-Sheet 3

Dec. 16, 1924.
G. R. BROWN
BALING PRESS
Filed May 4, 1917
1,519,109
7 Sheets-Sheet 4

Dec. 16, 1924.                                                                  1,519,109
G. R. BROWN
BALING PRESS
Filed May 4, 1917                                        7 Sheets-Sheet 5

Dec. 16, 1924.

G. R. BROWN

BALING PRESS

Filed May 4, 1917

G. R. BROWN

BALING PRESS

Filed May 4, 1917

Patented Dec. 16, 1924.

1,519,109

UNITED STATES PATENT OFFICE.

GEORGE R. BROWN, DECEASED, LATE OF OKLAHOMA CITY, OKLAHOMA; BY WALTER BROWN, TEMPORARY ADMINISTRATOR, OF ASHWOOD, TEXAS, ASSIGNOR TO CLAYTON GIN COMPRESS CO., OF HOUSTON, TEXAS, A CORPORATION OF TEXAS.

BALING PRESS.

Application filed May 4, 1917. Serial No. 166,398.

*To all whom it may concern:*

Be it known that GEORGE R. BROWN, deceased, late a citizen of the United States, residing at Oklahoma City, in the county of Oklahoma and State of Oklahoma, has invented certain new and useful Improvements in Baling Presses, of which the following is a specification, reference being had therein to the accompanying drawings.

This invention relates to improvements in an apparatus for producing cylindrical bales of cotton enclosed in fabric wrappers or envelopes, comprising mechanism for preliminarily forming and supplying bats or partially compressed webs; second, a baling mechanism having a series of rolls around a baling chamber so arranged as to cause the helical winding of the said bat as it is fed to the chamber; and, third, mechanism for supplying fabric wrappers and for tightly stretching them around the cotton mass and securing them in place.

The apparatus comprises three main elements. The first of these, namely, the cotton-supplying and bat-forming devices are indicated by A; the second, the baling apparatus by B, and the third, the wrapper holding and supplying devices by C.

The cotton is fed continuously from a condensing and supply apparatus which delivers a bat *a* to a chute *b*. The chute has a rising and falling section *c'*. When a sufficient length of a cotton web or bat has been passed to the baling press, this section *c'* is raised and tears the bat, the rear end of the coiling part continuing toward and entering the press, but the front newly formed end is raised to an accumulator A'. The cotton bat *a* is continuously supplied from the condenser to the accumulator until the baling press is ready to again receive a flow of cotton. At that time the section *c'* of the guideway is lowered again and both the web from the condenser and feeding rolls and the web from the accumulator are allowed to move down toward the press.

The supporting parts of the baling press comprise end frames—E on the right and D on the left. Each is formed with a stationary plate or element 1 and a movable hinged plate 2. These stationary frame elements or end plates rest upon legs or pedestals, those for one being indicated at 3 and those for the other at 4.

Figures 8, 9, 10, 11:
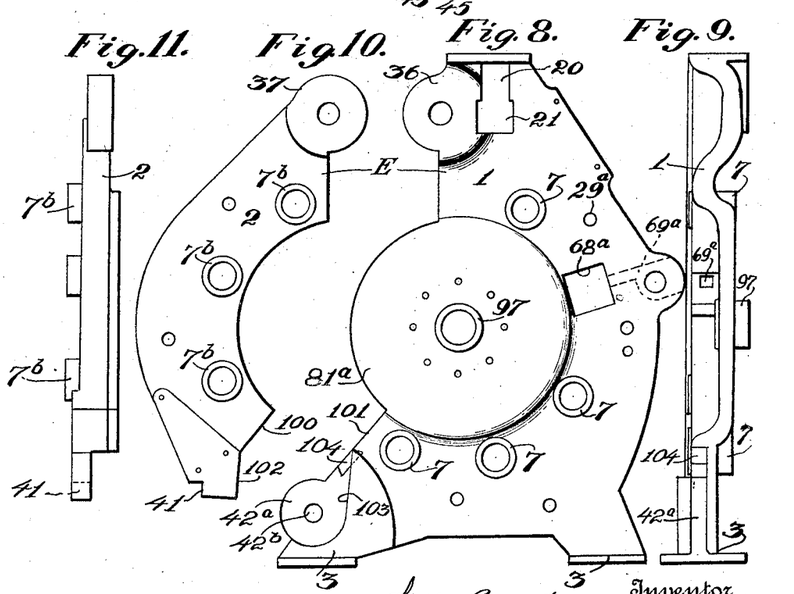
Figure 8 is an elevation or face view of the stationary part of one of the end frames of the baling mechanism.
Figure 9 is a view of the inner edge of this frame section.
Figure 10 is a face view of the movable part of one of the end frames.
Figure 11 is a view of the inner edge of the same.

Fig. 8 presents a face view or end elevation, and Fig. 9 an edge, of the frame element or plate at the end of the machine where are located the power devices for opening and closing the press. Fig. 10 gives a similar elevation or face view, and Fig. 11 an edge view, of the movable plate or end frame 2 at the last said end of the machine.

At the other end of the machine are located the devices for rotating the rolls and at this end there is a stationary plate or frame structure 1 and a movable section 2, respectively, substantially similar to those above described. The stationary parts of the two end structures 1, 1 are rigidly fastened and braced together by tie rods 29 seated in apertures $29^a$; and the two movable plates or frame elements 2 are bound together by similar cross rods 29.

The movable, swinging part of the roller frame has suspending plates or large eye pieces 37 which, respectively, fit inside of corresponding bearing plates 36 at the upper ends of the stationary frame elements. And after these are fitted together, a hinge rod 34 is passed through them and fastened by nuts. In the upper part of the stationary frame section is mounted the upper feed roll 17. It is keyed to a shaft 23 which, at its ends, is mounted in sliding bearing boxes 22 that are fitted in slots 20, 21 (Fig. 8) which provide vertical guideways in the upper part 19 of frame element 1. Above the bearings 22 are springs 25. In the upper ends of these are inserted bolts or threaded rods 24 with washer plates $24^a$ that can be adjusted on the rods to regulate the tension of the springs 25.

Figure 19:
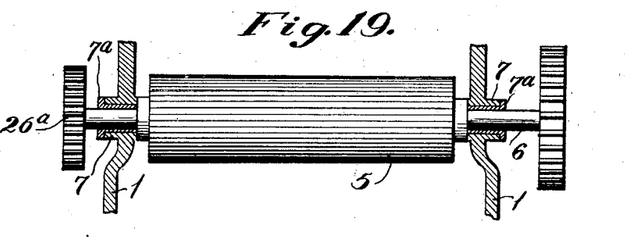
Figure 19 is a fragmentary view showing the first compressing roll of the series and its mounting.

At the center of the press there is a baling chamber which is approximately cylindrical in general conformation. It is surrounded by a series of rolls. As shown, five of these are mounted in the stationary parts of the end frames and three are mounted in the movable part. There is a series of shafts mounted around the chamber indicated by the numerals 6, $6^a$, $6^b$, $6^c$, $6^d$, $6^e$, $6^f$, and $6^g$. To these, respectively, are secured the rolls 5, $5^a$, $5^b$, $5^c$, $5^d$, $5^e$, $5^f$ and $5^g$. All of the rolls, except that at $5^a$, are mounted on axes which are fixed while the rolls are in operation. Fig. 19 shows roll 5 and its mounting. It is keyed to the shaft 6 which is mounted on bushings $7^a$, fitted into hollow bosses 7 cast on the stationary frame elements. Each of the rolls $5^b$, $5^c$ and $5^d$, is similarly mounted in the stationary frame. Each of the rolls $5^e$, $5^f$ and $5^g$ is mounted in bushings fitted in bosses $7^b$ on the swinging frame parts.

Each roll is formed with the peripheral approximately cylindrical shell, together with spiders and hubs.

Figure 20:
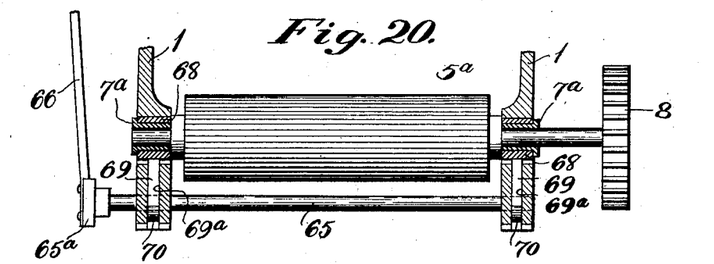
Figure 20 is a view of that roll of the series which is arranged to yield under pressure and showing the adjacent parts in section.
Figure 21:
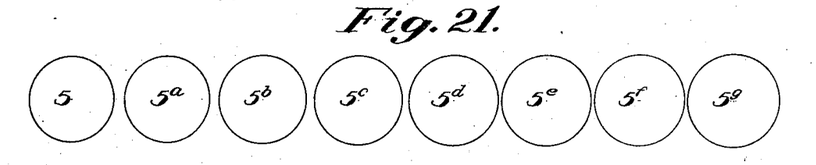

The shaft $6^a$ of roller $5^a$ is mounted in sliding bearings 68 which are fitted in elongated apertures $68^a$ (Fig. 8) in the stationary parts 1 of the end frames. The movement, bodily, of this roller and of its sliding bearings is used to indicate variations of pressure within the baling chamber up to a predetermined limit. Each bearing is arranged to engage with a finger 69 (Fig. 20) in a slideway $69^a$ (Figs. 8 and 20) in the frame, these fingers, in turn, engaging with lugs 70 on a cross rock shaft 65. This shaft has a head $65^a$ secured rigidly to it and a lever 66 is fastened to the head. On the lever is a sliding weight 67 which can be adjusted and then fastened by set screw $67^a$.

Figure 12:
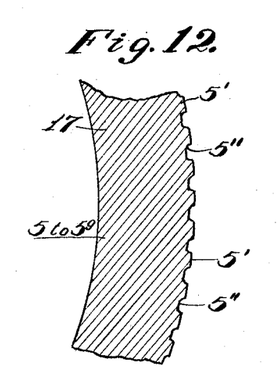
Figure 12 is a section of the peripheral part of one of the rolls on a large scale.
Figure 13:
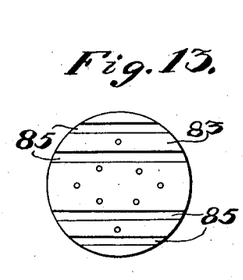
Figure 13 is a face view of one of the disk carriers to which are attached the removable head plates.
Figure 14:
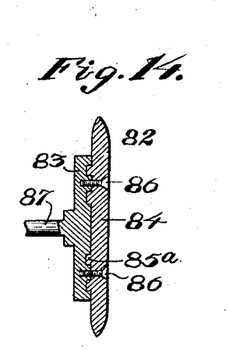
Figure 14 is a vertical section of a disk carrier and a head plate.

The peripheries of the rolls are not smooth but each is formed with ribs 5′ (Fig. 12) and intervening grooves 5″.

The ends of the baling chamber are heads 81 and 82. They are carried by spindles or shaft sections 87 and $87^a$. Each head is formed in two parts, namely, a carrier 83 and a detachable disk 84. The carrier is rigidly secured to the spindle or shaft and has grooves 85 in its inner face. The disks have tongues $85^a$ which fit the grooves, and they are held in place by inwardly removable screws 86.

Shaft 87 of head 81 is loosely mounted in the socket $10^b$ in the end of drive shaft 10. A ball bearing is placed between the carrier 83 and the frame, it having balls 92 and pressure plate 93.

Figures 6, 24:
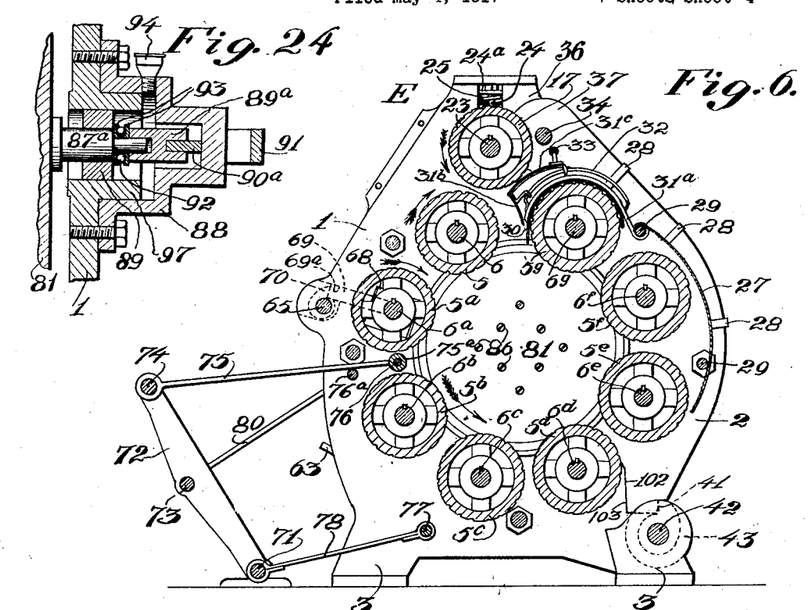
Figure 6 is a vertical transverse section taken on the line 6—6 of Figure 3.
Figures 21, 22, 23, and 24 show parts of the mechanism detached and more or less in detail.
Figures 7, 22:
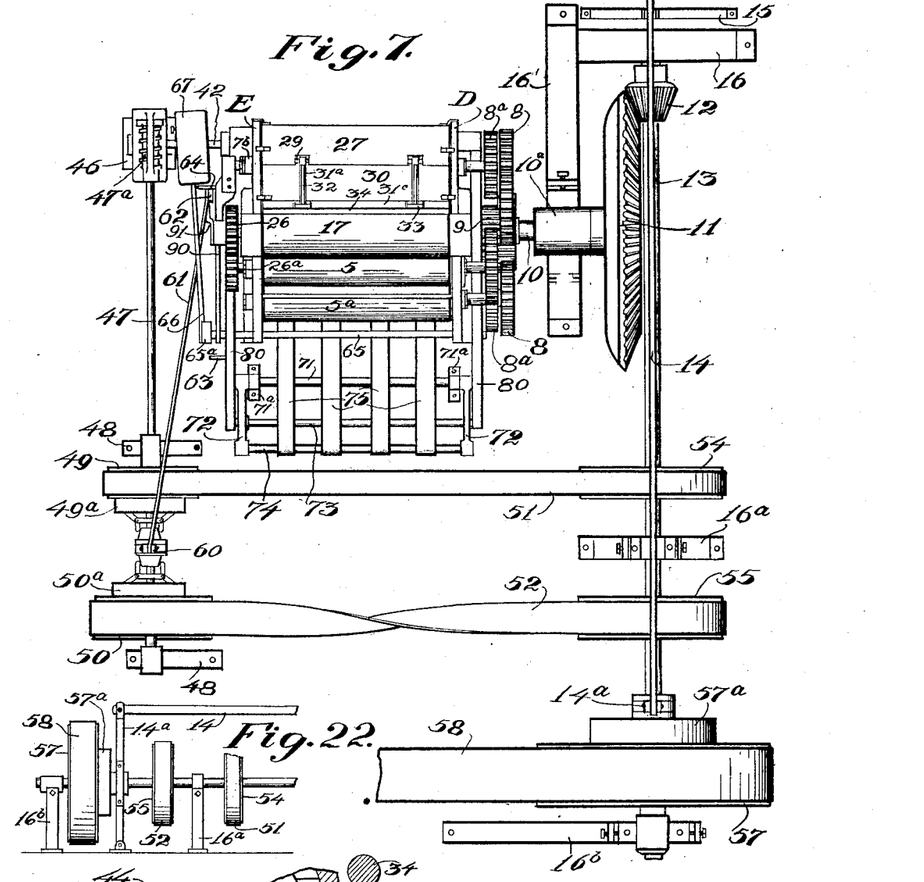
Figure 7 is a plan view of the baling apparatus and the devices which transmit power thereto.
Figure 15:
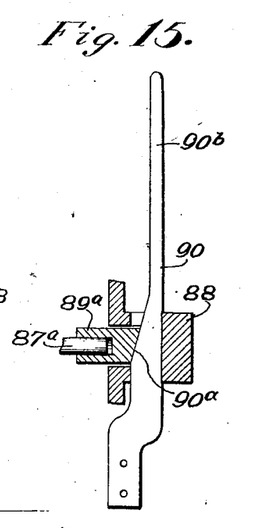
Figure 15 shows the wedge bar of one of the head plates in plan, together with adjacent parts in section.
Figures 16, 23:
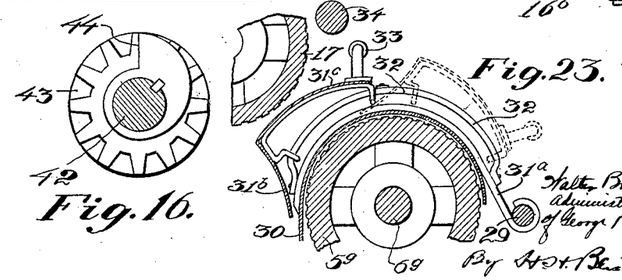
Figure 16 shows a face view of one of the press opening pinions.
Figure 17:
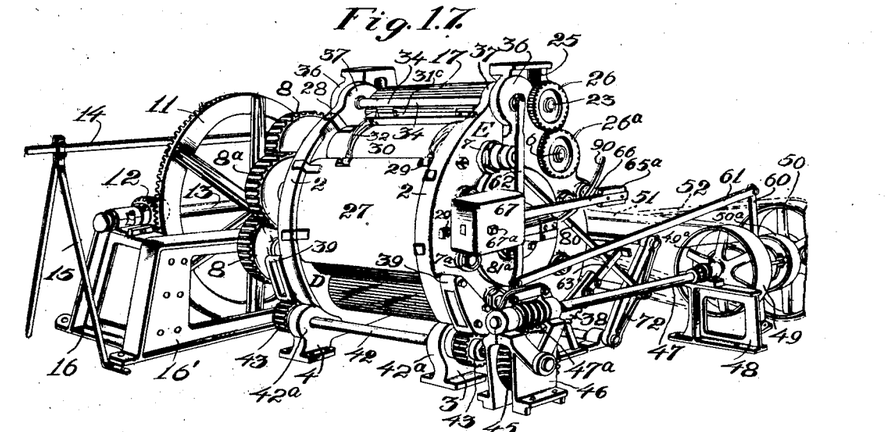
Figure 17 is a perspective of the baling mechanism.
Figure 18:
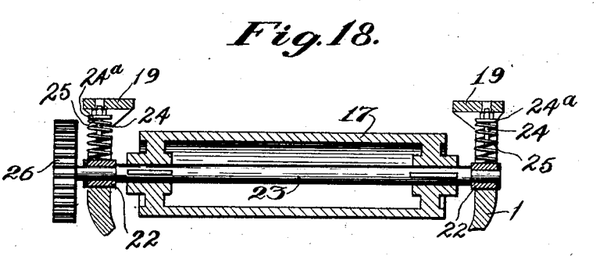
Figure 18 is a sectional view of the feed roller and the parts adjacent thereto for mounting it.

The spindle or shaft $87^a$ of the other head 81 is mounted in bushing 89 (see Fig. 24) in a bearing 97 formed in the stationary element 1 of the end frame. This shaft $87^a$ and its head 81 can move axially outward. The end of the shaft is reduced and fitted in the abutment block $89^a$ (Figs. 15 and 24). Between this abutment and the shoulder on the shaft there is a bearing having balls 92 and thrust plates or race plates 93 (Fig. 24). An abutment boss 88 bolted to the end of frame 1 surrounds the bearing boss 97 and the adjacent parts near the outer end of shaft $87^a$. Here the parts are so constructed as to provide an oil chamber in the boss or box 88, to which chamber oil is supplied through the cup 94 (Fig. 24), the lubricant readily reaching all the wearing surfaces and the ball bearing.

The spindle or shaft 87 of the opposite head 82 is lubricated by having said chamber $10^b$ in the shaft 10 and an oil cup 95 for supplying it with lubricant.

The end frame elements 1 are cast with outwardly swelled parts $81^a$ near the center of the baling chamber on lines opposite the heads.

Either of the heads 81, 82 can be readily withdrawn from the machine without requiring the removal of rolls, although these heads are of diameters greater than that of the bale chamber. To withdraw a head it is merely necessary to open the bale chamber by swinging outward the movable rollers, then withdraw the fasteners at 86 with an ordinary tool, and then slide the head proper on the lines of the grooves 84 in the carrier 83, that is, slide them transversely of the main axis, for their dimensions are such that they can pass through the opening in the side of the bale chamber when the swinging rolls are thrown up.

Figure 1:
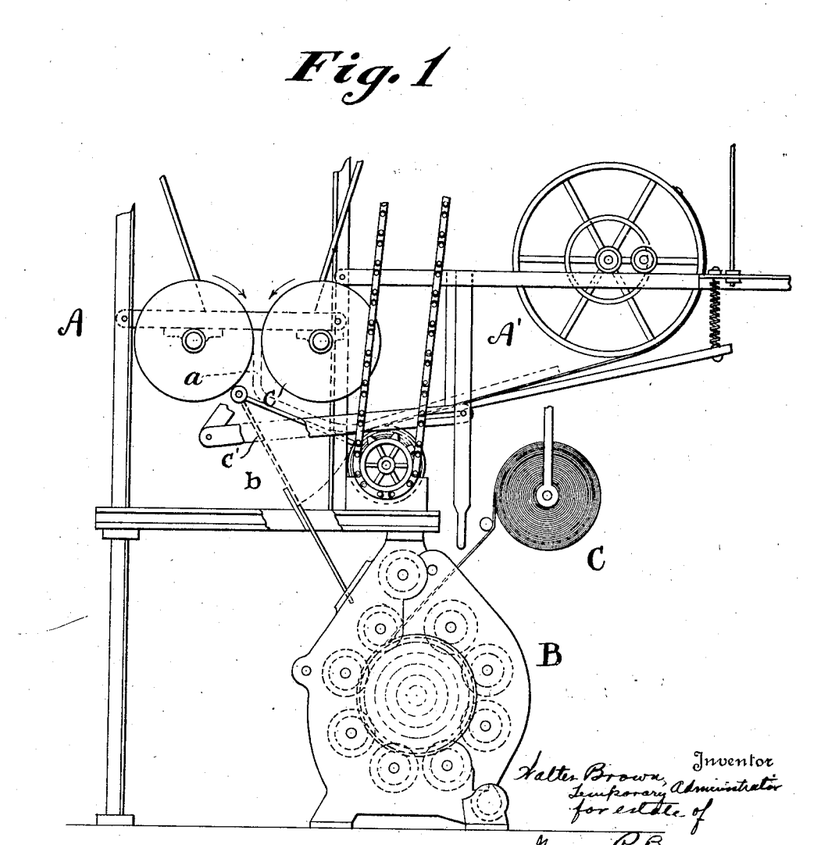
Figure 1 is an elevation, more or less conventional as concerns details, showing an apparatus embodying my improvements for producing wrapped cylindrical bales of cotton.
Figure 2:
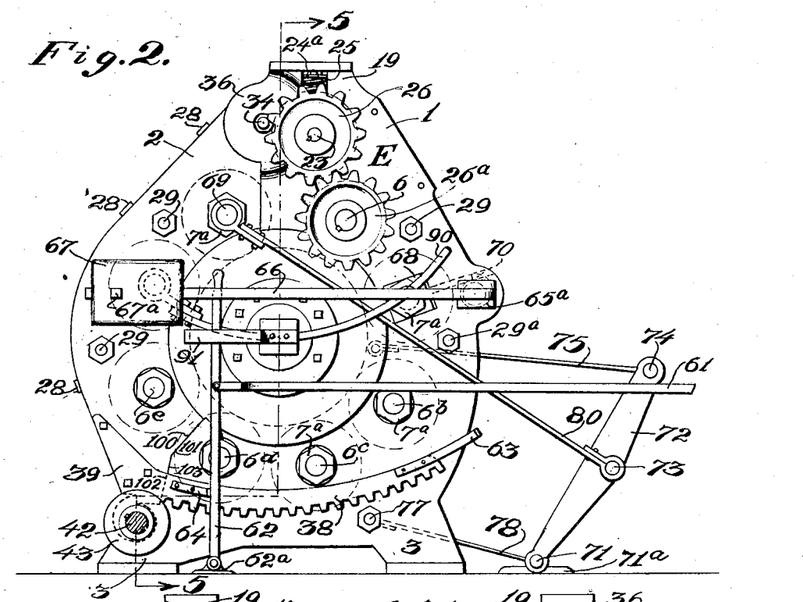
Figure 2 is an end elevation of the press looking at it from the end where the devices are located for opening and closing it.
Figure 3:
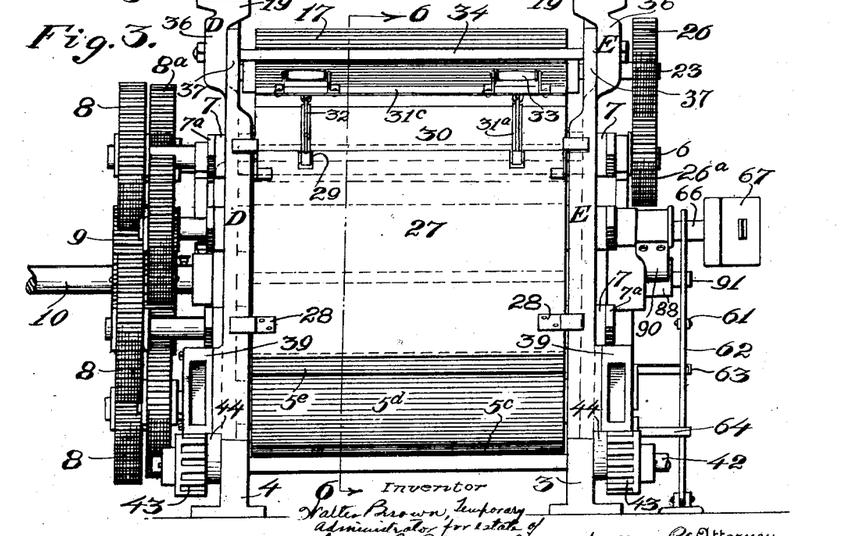
Figure 3 is a side elevation.

The axially movable head 82 is held in position by a wedge rod 90 (see Figs. 2, and 15), this rod having a narrow part 90$^b$ and an inclined or wedge shaped edge 90$^a$. When the rod is thrust forward the wedge drives the bearing block or abutment 89$^a$ inward, this, in turn, forcing the shouldered spindle or shaft 87$^a$ and the head 82 to their innermost positions. When the rod 90 is drawn longitudinally away relatively to the abutment block 89$^a$, the latter can move axially outward and permit the head 82 to similarly move.

When the swinging frame elements 2 and the rolls 5$^e$, 5$^f$ and 5$^g$ are in working position, the edges 100 and 102 of the frame elements 2 abut against the edges 101 and 103 (see Figs. 8 and 10) of the frame elements 1.

The swinging movements of the frame parts 2 and their rollers are accomplished as follows:

To each of these swinging parts 2 is secured a rack 38. It has a head 39 for fastening it to the lower end of the frame piece. This rack is a segment concentric with the aforesaid hinge bar 34. 42 is a cross shaft mounted in apertures 42$^b$ in bearings 42$^a$ on the stationary end elements of the frame. 43 are pinions on the shaft 42, each meshing with a rack 38. When the pinions are turned in one direction they swing the movable frame element 2—2 with its rollers outward, and when they are turned in the opposite direction they carry them back to their working position. To avoid having large cumbersome pinions at 43, any tooth of which would be strong enough to prevent the pressure of the cotton from swinging the rack outward, strong heavy stops 44 are employed which are also carried by the shaft 42 and preferably cast with the metal of the pinion, and these engage with stops 41 on the swinging frame pieces. Power is transmitted to the pinion shaft 42 through the worm gear 45 on the projecting end part thereof. It is driven by worm 47$^a$ on a countershaft 47 mounted at one end in bracket stand 46 and at the other end in one or more stands 48. This countershaft has two loose pulleys 49, 50, with which respectively engage a straight belt 51 and a cross belt 52. The belts are driven by pulleys 54, 55, on the main drive shaft 13 which receives power from the main belt 58 through belt wheel 57. The countershaft 47 has two conventionally illustrated reversing clutches 49$^a$ and 50$^a$ for connecting at will either of the two power pulleys 49 and 50. The operator standing at the front of the machine can connect either clutch to shaft 47 by hand lever 62 which moves link 61 connected to the clutch lever 60. Lever 62 is pivoted to the base of the machine or floor at 62$^a$ and at its upper end is held loosely in guide 91.

On one of the racks 38 there are lugs 63 and 64, one on each side of the lever 62. When the press is closing, the pinion and rack cause lug 64 to move lever 62 to a position where it brings the clutch 49$^a$ to neutral position. The operator can move the lever 62 further to bring clutch 50$^a$ into action, whereupon the power is imparted to the worm and to the shaft 42 and the pinions are caused to open the press. When lug 63 strikes lever 62 the clutch is brought to neutral position and the opening of the press is terminated. Thereafter the operator can draw lever 62 further forward to bring clutch 49$^a$ into action and, thereupon, the driving parts are reversed and the pinions cause the closing of the press.

When a bale is completed in the chamber it is positively ejected. To do this use is made of a series of thrust bars 75 pivoted to levers 72 by a cross rod 74, the levers being pivoted at 71 to a base (see Fig. 6) or to the floor. The position for fixing the pivot axes at 71 is fixed by means of spacing bars 78 pivoted to cross rod 77, these spacers serving also as braces. The thrust bars 75 carry a cross rod 76 at their inner ends which is provided with rollers 75$^a$. The cross rod lies near the periphery of the compression chamber. The rod 76 and the rollers are drawn toward the axis by links 80, one at each end of the machine, and pivoted to the rod 73 which is secured to the levers 72. The bars 75 are supported on cross guide rods 76$^a$. The links 80 extend from the cross rod 73 up to the axis of the last roll, 5$^g$ of the series, each link having an eye fitting an extension of the shaft 6$^g$.

The rolls are actuated as follows:

The main power shaft 13 is mounted in bearing stands 16, 16$^a$, 16$^b$ and is provided with a bevel pinion 12. This shaft is connected with, and disconnected from, the power devices by a friction clutch, conventionally illustrated at 57$^a$. With the clutch engages loosely a shifting lever at 14$^a$ and this lever is actuated by an operating rod 14 extending to the front of the machine where it is slidably supported in a bracket 15.

The bevel pinion 12 meshes with a bevel gear 11 on the aforesaid shaft 10, held in bearings $10^a$ on the axis of the roll chamber and supported on bracket frame 16'. The shaft 10 carries a wide faced spur wheel 9 which meshes with spur wheels on the ends of the roller shafts.

The roller shafts 6 to $6^g$ have alternately longer and shorter extensions around the series; the four shorter shafts 6, $6^b$, $6^d$ and $6^f$ have spur wheels $8^a$, and the four longer shafts $6^a$, $6^c$, $6^e$ and $6^g$ have spur wheels 8. The four inner wheels lie in the same transverse plane; and four outer wheels in the same transverse plane outside of those aforesaid. Both the inner wheels and the outer ones engage with the wide faced, long toothed, central driving gear 9. Hence, all the rolls rotate in the same direction.

The upper part of the baling mechanism is provided with shields. One section of this is indicated at 27. It is made of sheet metal and is suspended by hangers 28 engaging with the edge parts of the swinging frame. Its upper edge is curved and fits over the cross rod 29. The second shield section is indicated by 30. It is formed of sheet metal and is shaped to conform closely to the periphery of the last pressure roll $5^g$ of the series. It is supported partly by hinge rods $31^a$ engaging with a rod 29 and partly by brackets or hangers 28 which engage with the edge of the frame. It can be swung outward around the rod 29 as an axis.

This second shield section 30, in turn, supports a third, formed of sheet metal to have the plates $31^b$ and $31^c$. It is bodily movable in relation to adjacent parts. It is formed of guide elements which engage with a guide 32 secured to the second shield 30. It is also provided with handles 33. When in normal position the wall $31^b$ is in the space between the first roll 5 and the last roll $5^g$ of the series and provides a guide for the incoming cotton. At such times the wall $31^c$ lies close to the feed roller 17 and prevents the escape of cotton. It can be drawn bodily outward from this position along the guides 32 to permit the introduction of the wrapper fabric. When so drawn out the section 30 of the shield still remains in position around its roll and guards against accident to the hands of the operatives which have to be brought in proximity to the rolls to adjust the wrapper.

The upper roll 17 is driven from the first press roll 5 by means of the gear $26^a$ on the shaft 6 of the latter roll, this gear meshing with gear 26 on shaft 23 of the upper roll.

As concerns the roll driving gear, the present mechanism overcomes serious objections that were met with in using machines of this class as they were heretofore made. In the earlier machines, the power spur receiving gears on the ends of the roller shafts were of relative small diameter, and the central driving spur wheel was of large diameter, and this was necessarily so, as is both the driver and the driven wheels, swung in the same transverse plane.

Figure 4:
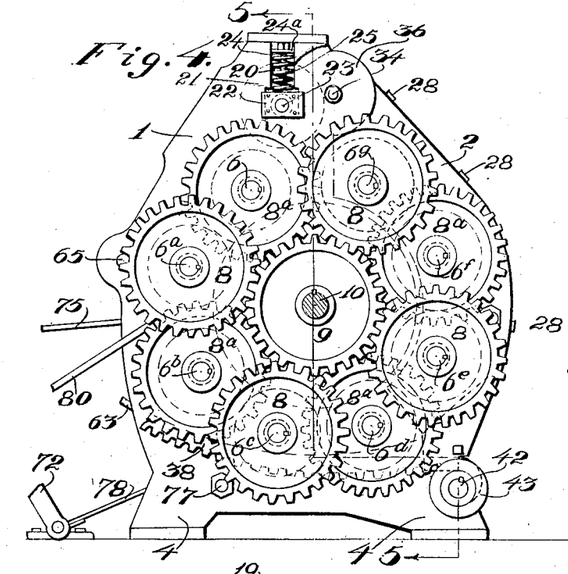
Figure 4 is an end elevation looking from the end where the roll driving devices are located.
Figure 5:
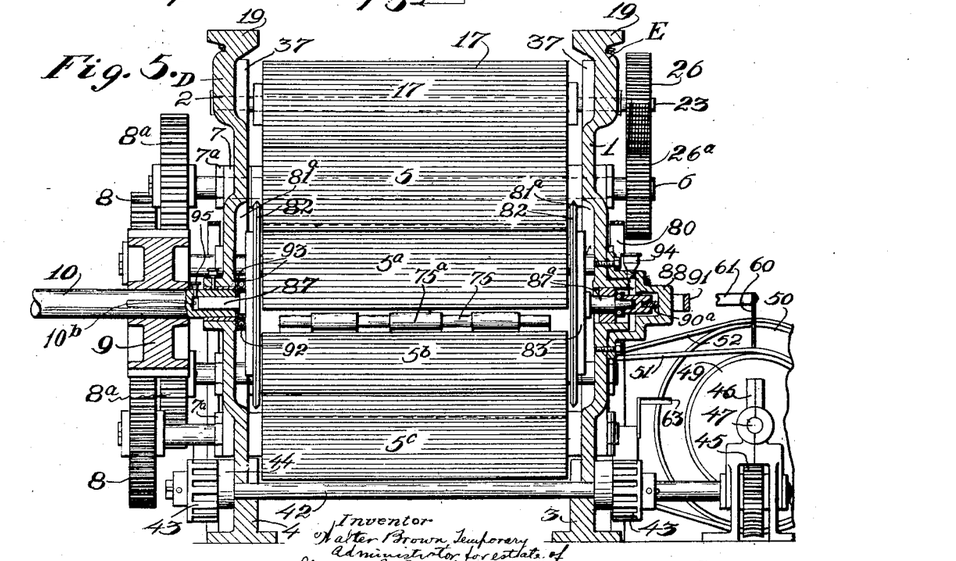
Figure 5 is a central, vertical, longitudinal section of the press.

In the present mechanism, the driving wheel is of comparatively small diameter and the driven wheels are of comparatively large diameters. Alternate rolls have shafts which project for longer distances, and the intermediate rolls have shorter projecting shafts. The wheels of the rolls having the longer shafts are in transverse planes other than the planes of the wheels on the shorter shafts; as will be seen on examining Fig. 4. These roll driving wheels must transmit high power and are liable to be broken or rapidly worn because of the excessive strains transmitted. In the present machine, the main drive wheel 9 and its teeth are relatively increased in strength because of the shortened diameter, and transmit power with advantage to the receiving wheels of both sets on the roll shafts, each of which wheels is relatively increased in diameter.

The rolls themselves are so constructed and actuated that they have constantly increasing peripheral speeds at points adjacent to the surface of the bale. As illustrated, they rotate with uniform, angular velocity, but being of gradually increasing diameters, the increase in the peripheral speeds referred to are caused by this increase in diameters.

It is obvious that the same differences in peripheral speed can be obtained in other ways, but the construction of devices shown is at present preferred because of its simplicity and avoidance of multiplication of gearing and other parts to predetermine the speeds.

The corrugations or grooves in the rolls roughen or break their surfaces, and insure a powerful grip upon the cotton and upon the textile envelope, and this form of roughened surface is preferred.

The wrapper or envelope which is placed around the bale is indicated by C. It is a suitable textile, such as burlap. It is supplied from the holding and delivering mechanism at C which may be a roll with automatic measuring and cutting devices. At the proper instant immediately after the forward advancing edge of the coil of bat has entered the passageway at F and has been pressed down flat to the final peripheral surface of the coiled bale, and the desired pressure has been reached, the shield $31^b$, $31^c$ is drawn backward and the free edge of the wrapper fabric is inserted and caused to be gripped by the roll 5. This roll draws the fabric inward from the coil at C, and as the bale surface travels to the second surface $5^a$, it bites upon the fabric and stretches it to some extent. The third roll maintains this stretch and adds an increment to it; and so on throughout the series. When the sheet reaches the terminal roll 5ᵍ, it is stretched to the limit of tautness and is passed on to the roll 5 again for the purpose of providing an overlap. Then the web is cut and suitable fastening devices are inserted near the outer edge of the severed envelope. The bale is continuing to roll, and, as the fastening devices reach the roll 5ᵃ, they are forced through the two layers of overlapping envelope, fabric, and the wrapper is firmly fastened while under the severe stretching and tension to which it is being subjected.

After the bale and fastening devices have made, say, one more revolution, the operator, by lever 62, throws the clutch 50ᵃ, whereupon the bale chamber opening devices are put into action and the movable element of the roll-supporting frame is swung out, and, simultaneously the wedge at 90 permits the head 82 to move axially outward. The pressures on the bale, both axial and radial, are relieved and the bale rolls from the machine. The end parts of the envelope or wrapper, while it is still under the circumferential stretching or tension now maintained by the fastening devices, are folded tightly against the end of the bale and secured by strong stitching.

The result is the production of an exceedingly tight elastic bale which is ready for convenient handling and can be transported and stored without danger of soiling or loss.

What is claimed is:—

1. In a mechanism of the class described, the combination with a roll support, of the set of rolls arranged in a series around a baling chamber, the rolls gradually increasing in diameter from the initial roll to the terminal roll, and means for rotating the rolls with uniform angular velocity.

2. In a baling mechanism having a central chamber adapted to contain a cylindrical bale and also an envelope surrounding the bale, the combination of a frame, a series of rolls positioned around said chamber and arranged to have their peripheries contact with said envelope, and power transmitting devices which rotate the peripheries of the rolls successively with increasing speeds.

3. In a mechanism of the class described, the combination of a series of rolls around a bale chamber, roll carriers, of which one is movable to open the bale chamber, a power mechanism, means for rotating the rolls, power devices for moving the chamber-opening means in opposite directions, a reversible clutch, devices carried by the chamber-opening means for moving the clutch in either direction, the clutch being adapted to be manually moved after it has been opened, a common driver for the roll rotating means and for the devices which actuate the chamber-opening means, and means for disconnecting the common driver from the power mechanism.

4. In a mechanism of the class described, the combination of a series of rolls around a bale chamber, carriers for the rolls, of which one is movable relatively to the other to open and close the bailing chamber, power mechanism, means for rotating the rolls, devices for actuating the chamber-opening means including separable interengageable power transmitting devices, means for manually engaging the last said devices, means for automatically disengaging said devices while the roll rotating means are in action, a common driver for the chamber-opening means and for the roll rotating means, and devices for disconnecting the common driver from the power mechanism.

5. In a machine of the class described, the combination of a frame, rolls positioned in a series around the bale chamber, and ejecting mechanism having vertically swinging bars pivoted on stationary axes, braces interposed between said axes and the frame, the bars 75 carried by the swinging bars, and anti-friction rollers mounted at the inner ends of said bars.

6. In a mechanism of the class described, the combination of a frame, rolls positioned in a series around a baling chamber, and a shield around the rolls adjacent the supply entrance of the chamber.

7. In a machine of the class described, the combination of a frame, the rolls positioned in a series around a central chamber, and a shield adjacent to the terminal roll at the supply end of the chamber, said shield extending around said roll to the peripheral surface of the baling chamber.

8. The combination of a frame having a stationary element and a swinging element, a series of rolls of which some are mounted on the stationary element and others are mounted on the swinging element, said rolls being normally positioned around a baling chamber, and heads at the ends of the chamber respectively and mounted on the stationary element of the frame, each head being formed in two parts separately secured together, the inner of said parts being of a diameter larger than that of the baling chamber and positioned in transverse planes beyond the planes of the ends of the rolls.

9. The combination of a frame having a stationary element and a swinging element, a series of rolls of which some are mounted on the stationary element and others are mounted on the swinging element, said rolls being normally positioned around a baling chamber, a driving shaft mounted on the axis of the baling chamber, and heads at the ends of the chamber each larger in diameter than that of the chamber, one of said heads being supported on the end of the said shaft and the other being mounted on the frame and both being separable from their supports and movable away from their normal positions while the rolls are in normal positions.

10. In a machine of the class described, the combination of rolls positioned in a series around a cylindrical baling chamber, rotary heads at the ends of the chamber, abutments for the heads, and anti-friction bearing devices interposed between the heads and the abutments, one of the abutments being axially movable to permit the anti-friction devices and the adjacent head to move axially outward from the chamber.

In testimony whereof, I affix my signature, in presence of two witnesses.

WALTER BROWN,
*Temporary administrator of the estate of George R. Brown, deceased.*

Witnesses:
M. D. ANDERSON,
R. T. LUTHRIGHT.